(12) United States Patent
Kroll et al.

(10) Patent No.: US 8,294,966 B2
(45) Date of Patent: Oct. 23, 2012

(54) HOLOGRAPHIC RECONSTRUCTION SYSTEM WITH OPTICAL WAVE TRACKING MEANS

(75) Inventors: Bo Kroll, London (GB); Armin Schwerdtner, Dresden (DE); Jean-Christophe Olaya, Dresden (DE); Steffen Buschbeck, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 514 days.

(21) Appl. No.: 12/525,426

(22) PCT Filed: Jan. 29, 2008

(86) PCT No.: PCT/EP2008/051027
§ 371 (c)(1),
(2), (4) Date: Nov. 24, 2009

(87) PCT Pub. No.: WO2008/092852
PCT Pub. Date: Aug. 7, 2008

(65) Prior Publication Data
US 2010/0067077 A1  Mar. 18, 2010

(30) Foreign Application Priority Data
Jan. 31, 2007 (DE) .......................... 10 2007 005 822

(51) Int. Cl.
G03H 1/22 (2006.01)
G03H 1/08 (2006.01)
G03H 1/04 (2006.01)

(52) U.S. Cl. ................... 359/32; 359/9; 359/35

(58) Field of Classification Search .............. 359/31–33, 359/35
See application file for complete search history.

(56) References Cited

U.S. PATENT DOCUMENTS
6,195,184 B1 * 2/2001 Chao et al. ............. 359/32
2005/0234348 A1 10/2005 Watanabe et al.

FOREIGN PATENT DOCUMENTS

| DE | 10 2005 023 743 | 11/2006 |
|---|---|---|
| EP | 0 946 066 | 9/1999 |
| WO | WO 94/22050 | 9/1994 |
| WO | WO 2004/044659 | 5/2004 |
| WO | WO 2005/062106 | 7/2005 |
| WO | WO 2006/027228 | 3/2006 |
| WO | WO 2006/119760 | 11/2006 |
| WO | WO 2007/099457 | 9/2007 |
| WO | WO 2007/131810 | 11/2007 |

OTHER PUBLICATIONS

International Search Report, dated Jun. 2, 2008, issued in priority International Application No. PCT/EP2008/051027 (in both German and English).

* cited by examiner

*Primary Examiner* — Jade R Chwasz
(74) *Attorney, Agent, or Firm* — Saul Ewing LLP

(57) ABSTRACT

A holographic projection system has an optical wave tracking system which adjusts the propagation direction of a modulated wavefront. It provides an adjustable wave tracking system which aligns the modulated wave with a desired eye position of one or more observers and follows the movements of the observer. The system comprises spatial light modulation means which modulate a wave with holographic information for the purpose of holographic reconstruction. The optical wave tracking provides the light path of the modulated wave with a desired propagation direction which guides the modulated wave out of the reconstruction system via a light exit position of a display screen. Position control means set adjustable tracking mirror means in terms of their inclination to a reflection direction for reflecting the modulated wave and deflection means, which are located in the set reflection direction, reflect the wave via the display screen into the desired propagation direction.

13 Claims, 4 Drawing Sheets

HOLOGRAPHIC RECONSTRUCTION SYSTEM WITH OPTICAL WAVE TRACKING MEANS

CROSS REFERENCE TO RELATED APPLICATIONS

Figure 1:
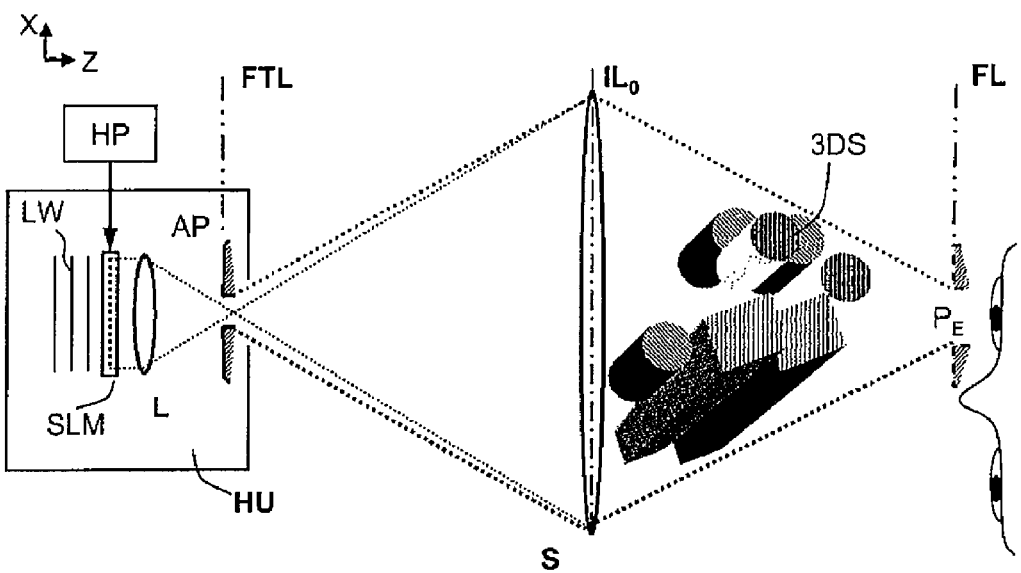

This application claims the priority of PCT/EP2008/051027, filed on Jan. 29, 2008, which claims priority to German Application No. 10 2007 005 822.7, filed Jan. 31, 2007, the entire contents of which are hereby incorporated in total by reference.

FIELD OF APPLICATION OF THE INVENTION

The present invention relates to a holographic reconstruction system with optical wave tracking means, which, if an observer changes their position while watching a holographic reconstruction, directs the optical axis on which the holographic reconstruction lies at at least one eye of an observer with the help of a position controller and an eye finder. The invention is independent of the way the holographic information is provided, and it can also be used in systems which allow multiple observers to watch holographically reconstructed video scenes simultaneously.

TECHNICAL BACKGROUND OF THE INVENTION

A holographic reconstruction system in the sense of this invention displays preferably moving three-dimensional scenes in real-time using video means by way of holographic reconstruction. The system comprises continuously controllable spatial light modulator means, which are encoded by a hologram processor with sequences of video holograms in order to spatially modulate waves of light which is capable of generating interference with holographic information. Thanks to the effects of light diffraction, the modulated light waves reconstruct object light points in an external reconstruction space in front of the eyes of observers, by way of local interferences, where said object light points optically reconstruct the desired three-dimensional scene. Light waves which represent the entirety of all object light points propagate in a directed manner towards the eyes of observers, so that one or multiple observers can watch those object light points in the form of the scene. In contrast to a stereoscopic representation, a holographic representation realises a substitution of the object.

In order to achieve a satisfying quality of the reconstruction, the observers should also be able to watch a reconstruction in a sufficiently large range of vision. Consequently, the reconstruction space must be as large as possible, and the size of the reconstructed scene should be at least 50 cm in diagonal, similar to TV and video representations.

However, it is disadvantageous that holographic reconstructions using large-sized light modulator means require for large diffraction angles a much higher resolution of the light modulator means than would be necessary for two-dimensional image representations, as is described by the known sampling theorem. This makes extraordinarily great demands on the hardware and software resources of the holographic reconstruction system—both as concerns the components for real-time provision of holographic information for encoding, and those for optical reconstruction of the scene.

Another known problem when reconstructing is an undisturbed propagation of the required light waves prior to generating interference. In order to reconstruct the object light points at the original position in space, and with the correct light point values, at least a part of the interfering light waves must arrive simultaneously at all the positions at which object light points are to be reconstructed through interference. This means that spatial coherence is required among as many as possible of the interfering light waves at each desired object light point.

Moreover, the wavelengths of the light waves which contribute to an object light point must not exhibit any uncontrolled path length difference among one another as caused by optical means.

In the description below, the term 'optical axis' denotes a straight line which coincides with the axis of symmetry of a reflecting or refracting optical element. Spatial light modulator means, which have been encoded by a hologram processor with holographic information of a three-dimensional scene, represent a 'video hologram'. The interaction of a video hologram which is illuminated with coherent light with imaging means causes 'a modulated wave' to be generated. The imaging means define a 'direction of propagation' of the modulated wave. This direction of propagation can be modified by 'optical wave tracking means'. If optical elements are disposed on the way to or if their effective direction is towards the video hologram, they will be referred to as 'hologram-side', and if they are disposed on the way to or if their effective direction is towards an eye position of an observer eye, they will be referred to as 'observer-side'. A 'visibility region' describes a space which is disposed on the observer side at an eye position, and which represents the exit pupil of the system, and in which at least one observer eye must be situated for observing a holographically reconstructed scene. If, as is the case in the present application, an optical wave tracking means tracks the modulated wave to the current eye positions, the 'tracking range' defines the space which embraces all eye positions for which tracking is possible. In the technical literature on the subject, such a projection system is also known as a projection system with eye tracking.

The applicant of the present invention has already published several solutions for reducing the required resolution of the spatial light modulator means, for example in the international publication no. WO 2004/044659, titled "Video hologram and device for reconstructing video holograms".

Those solutions are substantially based on one general principle. A wave which is spatially modulated with holographic information reconstructs the three-dimensional scene in a reconstruction space outside the system, said reconstruction space being positioned in front of one or both eyes of one or multiple observers. The geometry of the reconstruction space is defined on the one hand by the exit surface area of a display screen, through which the modulated wave leaves the reconstruction system, and, on the other, by the image area of a light source image, which forms a visibility region, also referred to as observer window, for at least one eye of one observer. Both surface areas define the geometry of a conical reconstruction space, while video holograms can also be encoded such that object light points do not only appear in front of, but also on and behind the display screen.

While the exit surface area of the display screen shall be as large as possible in order to achieve a large range of vision, the area of the visibility region can be reduced to the size of an eye pupil in order to efficiently use the resolution of the modulator means. The latter helps to keep the resolution of the modulator means low and thus to reduce the amount of information to be provided for holographic encoding.

From the geometrical description it becomes apparent that the reconstruction space shall preferably have a conical shape with an apex angle which is as large as possible, in order to be able to show large objects of a three-dimensional scene in their entirety as the distance between the observer and the reconstruction increases. However, a small visibility region may lead to problems with the visibility of the three-dimensional reconstruction, if the observer eye is only partly situated inside the visibility region. Already a slight movement of the observer may cause effects such as disappearance of visibility, vignetting or distortion of the spatial frequency spectrum. Moreover, the borders of the reconstruction space are difficult to find for an observer whose eyes are situated outside the visibility region. This is why the position of the reconstruction space is preferably adapted together with the visibility region and the position of the reconstruction itself to the new eye position if an observer moves. According to the known solution, the adaptation of the holographic reconstruction system to the eye position is executed by dislocating the illumination means which illuminates the light modulator means.

Because in a small visibility region the observer can see the holographic reconstruction with one eye only, a second wave, which is directed at the other eye, must provide a second reconstruction which differs in parallax. Because both reconstruction spaces must have the same base on the display screen in order to ensure perception of the two reconstruction spaces free from aberrations, their respective waves are spatially or temporally interleaved with the help of known autostereoscopic means. Spatial frequency filters and focussing means prevent optical cross-talking between the modulated waves. Such solutions have already been disclosed by the applicant in the aforementioned international patent application and in the application no. WO 2006/027228, titled "Method and device for encoding and reconstructing computer-generated video holograms". If the reconstruction system is additionally meant to allow multiple observers to watch different reconstructions simultaneously, additional modulated waves will be required, typically two for each observer. These additional waves can be generated either in a space- or in a time-multiplex mode. However, the provision of additional waves will not be dealt with in this application.

In order to maintain a certain clarity, the description below relates mainly to the alignment of a single wave of the holographic system. The reconstruction system can modulate and direct further waves in analogy to the first one, if required. It appears to those skilled in the art that the idea of this invention can be applied as often as necessary for this, depending on the actual number of waves. When doing so, functional elements of the invention can preferably be used commonly for multiple modulated waves.

Light modulators as used in conventional video and TV projectors, with screen diagonals of few centimeters and smaller, are particularly suited for high-resolution, fast light modulation. In combination with the aforementioned geometry of the reconstruction space and small visibility regions, their small size also reduces the number of holographic cells which must be provided, addressed and encoded for each video hologram. This considerably reduces the computational load for each individual hologram, so that conventional, less expensive computing equipment can be used. Moreover, the illumination of the light modulator means with light which is capable of generating interference can be realised much easier, if the light modulator means are of smaller dimensions. In order to realise the aforementioned geometry of the reconstruction spaces, the reconstruction system is preferably designed as a projection system which optically enlarges the modulated wave prior to the reconstruction.

The international publication no. WO2006/119760, titled "Projection device and method for holographic reconstruction of scenes", discloses a holographic projection system. This system will now be described in detail with reference to FIG. 1.

A plane wave LW with light which is capable of generating interference illuminates the entire surface area of a spatial light modulator SLM, which has a diagonal of no more than few centimeters, for example. In this embodiment, the light waves pass through a transmissive light modulator SLM. If the optical arrangement is modified accordingly, a reflective light modulator can be used instead as well. In any case does the modulator comprise modulator cells which are dynamically encoded by a hologram processor HP with holographic information of a desired three-dimensional scene. The encoded modulator cells thus represent a dynamic video hologram.

An optical projection system L projects the video hologram into an image plane $IL_0$ on a focussing display screen S in an enlarged manner. A spatial frequency spectrum of the video hologram is thereby formed in the image-side focal plane of the optical projection system L, which is also referred to as the Fourier plane FTL.

Because of their matrix arrangement, the modulator cells modulate the wave spatially and equidistantly. As a consequence, multiple diffraction orders are simultaneously created in a periodic sequence in the Fourier plane FTL, which lie at different positions in a periodicity interval. The focussing display screen S would image all periodic sequences into the observer plane OL, and an observer would see them with an eye which is situated outside the visibility region, which is known as optical cross-talking. In order to avoid this, a spatial frequency filter AP in the form of an aperture mask is disposed in the Fourier plane FTL. Said mask prevents cross-talking by selecting one diffraction order, and the focussing display screen S only images the spatial spectral range of the modulated wave which has passed the spatial frequency filter AP into an observer plane OL at an eye position $P_{E0}$. A visibility region for watching the reconstructed three-dimensional scene 3DS is thereby created at the eye position $P_{E0}$. The image of the spatial frequency filter AP defines the geometry of the visibility region.

The diameter of the holographically encoded modulator cells, which are imaged on the display screen S, defines the other end of the reconstruction space.

In the example shown in FIG. 1, the display screen S is a lens. However, as explained above, the diameter of the display screen S should be very large compared with the size of the optical projection system L, so that the display screen can preferably also be a concave mirror.

In contrast to other known systems, this holographic projection system requires a special encoding of the modulator cells with the holographic information. The modulator cells are encoded with a video hologram such that the reconstruction of the three-dimensional scene 3DS through interferences only appears in that part of the light wave path where the enlarged and focussed wave has already left the reconstruction system through the display screen S. This allows optical path differences which may occur later during the propagation of light waves, e.g. due to different path lengths, to be taken into account already when encoding the modulator cells.

The described projection system also reconstructs the three-dimensional scene 3DS in a fix reconstruction space, and the scene will only be visible if one eye of the observer is situated in the visibility region, which is not physically visible. Unlimited mobility in front of the reconstruction system without loss or restriction of visibility of the holographic reconstruction will again be impossible with this projection system alone.

If an observer moves, position control means must track the reconstruction space and the modulated wave to the eye position of the respective observer eye such that the visibility region at the end of the reconstruction space always begins behind the eye position and the reconstructed scene always remains visible without any restrictions. For this, the projection system shown in FIG. 1 comprises an eye finder, known as such, which detects the exact eye position and which controls with the help of the position controller the visibility region to the new eye position. Such solution is known from patent document no. EP 0 946 066.

For a realistic holographic reconstruction, when tracking the modulated wave, also the holographic code provided to the modulator means can be adapted to the current eye position, because also in reality the viewing angles towards the spatial arrangement of objects of the three-dimensional scene and their visibility change if the observer position changes. Depending on the eye position, individual object details of the scene which are situated at various depths may or may not be visible due to varying overlapping of details and/or observer distances.

However, in a simplified holographic representation, an adaptation of the visibility of object details to the current eye position may be omitted.

Figure 2:
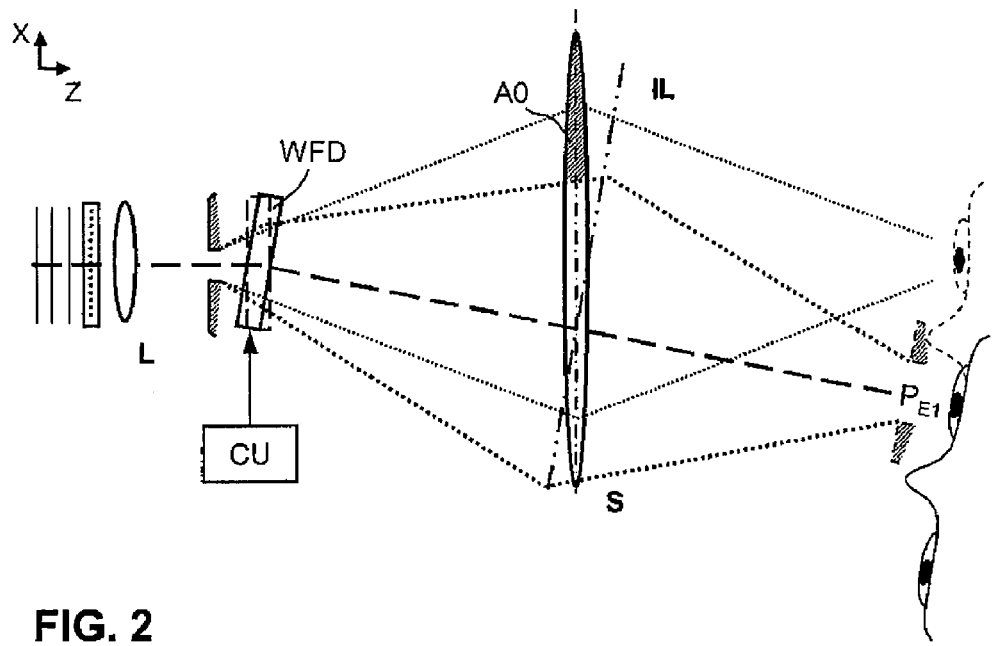

Tracking by way of dislocating the entire reconstruction system is hardly feasible because of the size and weight of the display screen. The inventors have therefore already suggested in the German patent application no. DE 10 2006 024 092.8 to direct the modulated wave at the position of the corresponding observer eye with the help of an electronically controllable deflection unit, which is disposed in the vicinity of the focussing display screen. However, this requires great efforts as regards material resources and costs, because the deflection unit must be about as large as the display screen because it is disposed in the vicinity of the latter. If in contrast the deflection unit DFU is disposed closer to the projection lens L, as shown in FIG. 2, its size will be about the same as that of the projection lens L, and the deflection unit DFU can be built much smaller and thus more inexpensively. However, this requires a larger display screen S, as indicated in FIG. 2, because due to the inclination of the modulated wave towards an eye position $P_{E1}$, the enlarged wave always only exits the reconstruction system through a limited section of the display screen S. A large section AO of the display screen S then always remains unused, because the exit position of the modulated wave varies as the eye position changes.

However, if the system has a small visibility region, so that each eye requires a separate modulated wave, it will be difficult to ensure with this solution that the two reconstruction spaces have the same base on the display screen.

FIG. 2 also shows that the deflection unit DFU prevents the effect that the image of the video hologram is not created directly on the display screen S. Instead, it lies near the display screen S in an inclined image plane $IL_1$.

A satisfactory function of the deflection unit thus usually makes great demands on the optical elements of the reconstruction system. In particular, optical elements are required to have very large diameters, which means that in addition to a noticeable consumption of material, aberrations will occur which are difficult to correct.

The international application no. WO 2005/062106, titled "Projection apparatus for display of images floating in space" discloses a projection device for the display of two-dimensional images which float in space. That projection device comprises an image display, a pivoted planar mirror and a fix concave mirror. The document teaches that floating images will be displayed at a larger distance from the projection device if the concave mirror has an elliptic shape. The planar mirror can be pivoted at a right angle to the projection axis, in order to vary the angle of the main optical axis when the images exit the system. The distance, size and viewing angle of the floating images depend on the size of the elliptic mirror, on the positions of its foci, and on the location of the image display which is created through the interplay of the reflecting surfaces. Because of the different layout of the optical path of the wave modulated with two-dimensional image information, the aforementioned requirements cannot be fulfilled in the context of a holographic reconstruction.

The US-American application no. US 2005/0234348, titled "Apparatus for displaying images by projection on retina of viewer with eliminated adverse effect of intervening optics", discloses a "retinal scanning display", where an optical scanning system with a two-dimensionally pivoted scanner mirror and an elliptic projection mirror serially project an intensity- and phase-modulated laser light beam of the primary colours RGB each on to a retina of an observer eye. The image is reconstructed on the retina by way of serial pixel synthesis. The optical scanning system is disposed directly in front of an observer eye, and the scanner mirror with its two pivoting axes is disposed in one focal point of the elliptic projection mirror and the retina of the observer eye lies in the other focal point of the elliptic projection mirror. Because the image is composed of a serial sequence of laser light beams, i.e. of pixel by pixel and line by line of a scanned video image, that prior art solution is not suitable for holographic reconstruction through interference, because multiple light waves which would interfere are not simultaneously available. That solution does not use a spatial light modulator in the sense of the present description.

SUMMARY OF THE INVENTION

It is the object of the present invention to provide a controllable optical wave tracking for a holographic reconstruction system which holographically reconstructs a three-dimensional scene in at least one reconstruction space through diffraction of light and creation of interferences of modulated light of a wave. Before the modulated wave leaves the reconstruction system through a display screen, the optical wave tracking shall direct the modulated wave at a desired eye position of one or multiple observers and follow the movements of the observer(s). The reconstructed scene shall be visible without errors and in a constant quality from any eye position.

In order to keep the dimensions of the reconstruction system at a minimum, the optically effective surface areas of the optical elements shall be used as completely as possible, irrespective of the eye position. This means that the modulated wave shall leave the reconstruction system at the display screen through a light exit area at a fix position, which is independent of the eye position.

The optical wave tracking must guide all sections of a wave through its optical path, from modulation by spatial light modulator means to the reconstruction, such that all interfering light arrives coherent at that position in the reconstruction space which corresponds with the position in the original scene, in order to reconstruct the desired object points without geometrical bias.

In order to achieve a good utilisation of the resolution of the light modulator means, the reconstruction space preferably exhibits a visibility region which is significantly smaller than the light exit area on the display screen. Because in such a system a separate wave is modulated for each observer eye, at least the reconstruction spaces which are provided for one observer must always have the same light exit area, i.e. congruent bases on the display screen, for both observer eyes. Further, for correct perception of the reconstruction, the two modulated waves must occur in the same areal geometry on the display screen and the reconstructions for both eyes of an observer must be of like size. Otherwise the reconstruction will move in relation to the display screen if the observer moves.

This is why with a small visibility region and large display screen it must be possible for each visibility region to be positioned within a tracking range which is several hundred times larger than the visibility region itself. The angle of the optical axis of the modulated wave may thus differ significantly from the optical axis of the display screen. This causes aberrations and differences in the optical path lengths during the propagation of individual modulated light wave sections and deformations of the wave, which must be compensated prior to the reconstruction.

The reconstruction system of the invention modulates with the help of spatial light modulator means a wave which contains holographic information, and it additionally comprises position control means, which direct the modulated wave such that it propagates towards an eye position. Behind each eye position there is a visibility region, which serves at least one observer eye. The modulated wave leaves the reconstruction system prior to the holographic reconstruction through a display screen at a light exit area at a defined position, which is defined by centre planes of the exiting modulated wave. Each reconstruction appears in an assigned reconstruction space.

According to the invention, the holographic reconstruction system comprises pivoted tracking mirrors and deflection mirror means. The tracking mirror means have at least one rotation axis and are disposed in the optical path of the modulated wave. Based on position information which describes an eye position and which is provided by an eye finder, a position controller controls the inclination of the tracking mirror means such to correspond indirectly with the eye position. Because of the thus set inclination, the tracking mirror means reflect the modulated wave into an eye-position-specific direction, where at least sections of the reflecting surfaces of deflection mirror means are disposed. This means that the deflection mirror means redirect the wave which is reflected from the tracking mirror means prior to its exit from the system through the display screen to its direction of propagation towards the eye position which was found by the eye finder.

The tracking mirror means are preferably disposed at a location where optical means realise an intermediate image of the filtered video hologram, which is encoded on the spatial light modulator means.

The deflection mirror means are disposed between the display screen and the tracking mirror means such that another image of the video hologram is created near the display screen, ideally on the display screen, so that all modulated light wave sections cover about the same path lengths on their way from the tracking mirror means to the display screen. The closeness of the image of the video hologram to the display screen depends on the field angle between the direction of propagation of the modulated wave in the reconstruction space and the orthogonal optical axis of the display screen.

This arrangement of the mirrors has the effect that the conditions of coherence of almost all interfering light waves of the deflected wave will be maintained at the location of the reconstruction. At the same time, the image of the video hologram always lies at the same defined light exit position on the display screen.

Preferably, a spatial frequency spectrum of the modulated wave has already been created by way of Fourier transformation at projecting means, and disturbing diffraction orders, which occur due to the spatial modulation, have already been removed using optical spatial frequency filter means at the location of the tracking mirror means.

In contrast to a scanner mirror in a projection image system, which scans with individual light beams a video image through a rotary movement so to obtain a line sequence, the tracking mirror means reflect the entire modulated wave or at least segments thereof which always contain a multitude of light wave sections which exhibit mutual coherence and which contain holographic information.

According to a simple embodiment of the invention, both the tracking mirror means and the deflection mirror means are fixed in a pivoted manner and, in addition, at least the deflection mirror means are fixed in a dislocatable manner. The position controller then moves both mirror means in relation to the modulated wave and the light exit position to such mirror positions that the optical path lengths from the tracking mirror means to the display screen are identical for all light waves.

In order to achieve a compact design of the reconstruction system, in particular of the deflection mirror means, the deflection mirror means can be fitted with a concave reflecting surface such that they image the intermediate image of the video hologram in an enlarged manner, compared with the display screen.

The position controller also preferably moves the deflection mirror means on a concave track, in order to simulate a segment of the ellipsoid with two focal points.

The rotation point or centre of the axis of the tracking mirror means, which can be controlled as regards their inclination, must lie in a focal point of the ellipsoid. The centre of the light exit area on the display screen is then situated in the other focal point of the ellipsoid.

According to a preferred embodiment of the invention, the deflection mirror means are disposed at a fix position in the system and their surface areas have a dimension such that in each desired adjustment position always a section of their reflecting surface lies in the optical path of the wave which is reflected by the tracking mirror means. For this, the deflection mirror means are formed as a segment of an ellipsoid, and a pivoted tracking mirror is disposed such that its centre lies in a focal point of the ellipsoid. The display screen with the light exit position lies in the other focal point of the ellipsoid.

As a consequence, merely by changing the inclination of the tracking mirror means with the intermediate image, the same effect is achieved as would be caused by moving an entire holographic unit comprising the spatial light modulator means with illumination means as well as optical projection means.

SHORT DESCRIPTION OF FIGURES

The inventive solution will now be explained in more detail with the help of several embodiments. and accompanying drawings, wherein:

FIG. 1: is a top view showing a holographic projection system with the face of an observer at an eye position. This system has been described by the applicant in the introductory section of the description above, and it was already disclosed in the international application no. PCT/DE 2006/000896.

FIG. 2: is a top view showing a holographic projection system with an electronically controllable deflection unit, which directs the direction of propagation of the modulated wave at an eye position. Again, this system has been described in the introductory section of the description above, and it was already disclosed in the German patent application no. DE 10 2006 024 092.8.

Figure 3:
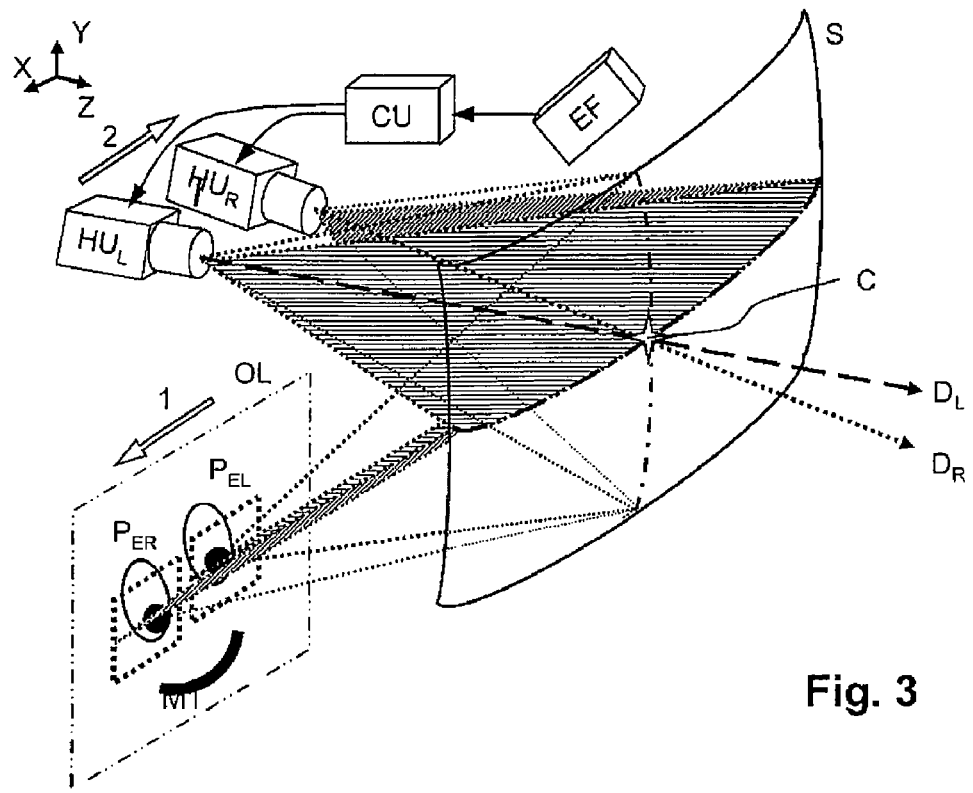

FIG. 3: shows a perspective view of the principle of a holographic projection to illustrate the technical problem solved by the present invention.

Figure 4:
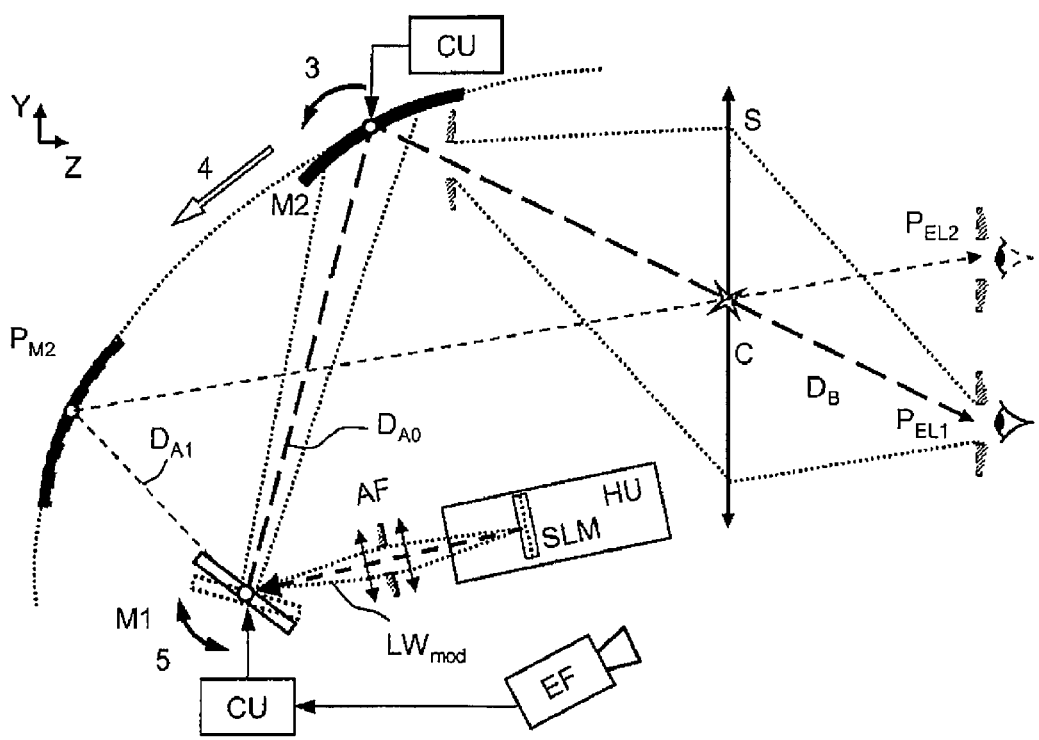

FIG. 4: shows a side view of the holographic projection system which illustrates the controllable optical wave tracking means according to a general embodiment of the present invention.

Figure 5:
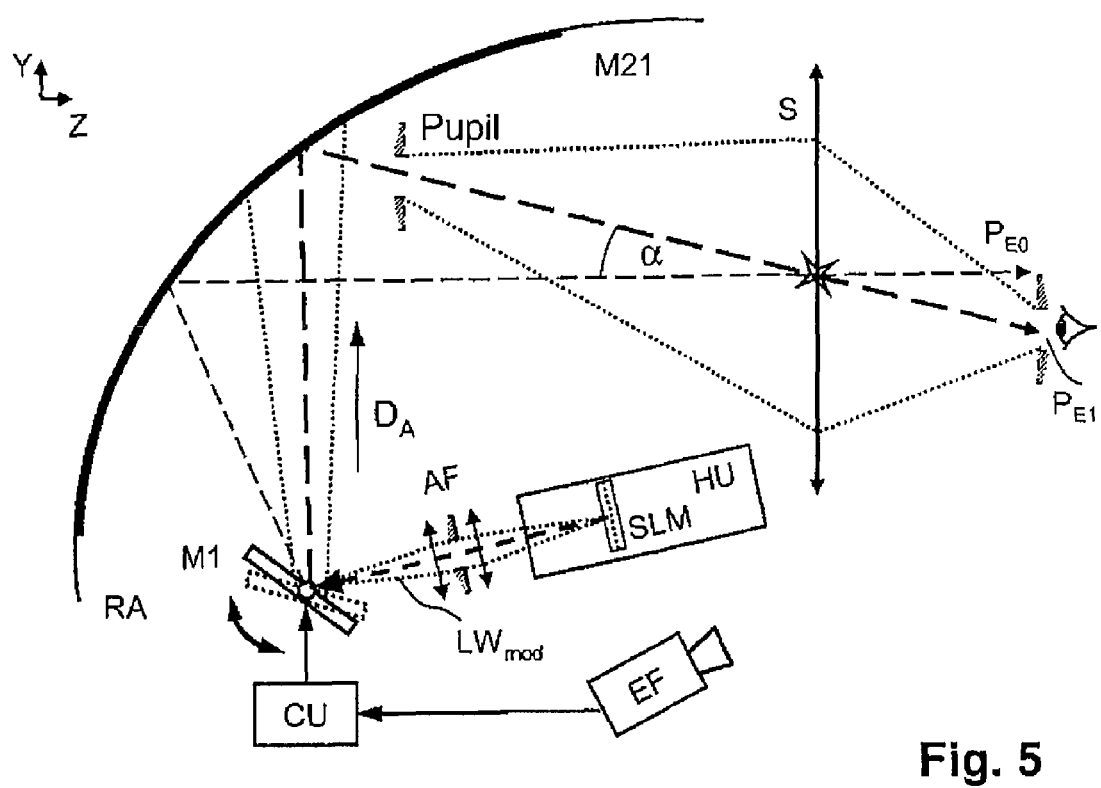

FIG. 5: shows a preferred embodiment of a holographic projection system according to the invention, where the position control means only move the tracking mirror means in order to compensate position changes of an observer.

Figure 6:
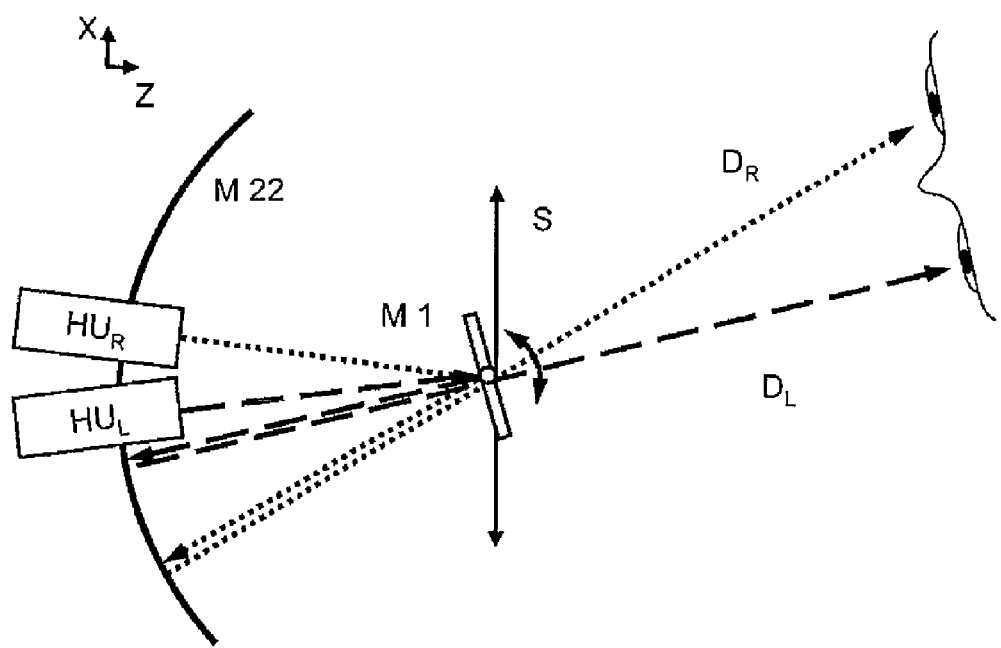

FIG. 6: is a top view showing another embodiment of the controllable optical wave tracking means for a holographic projection system according to the present invention.

Figure 7:
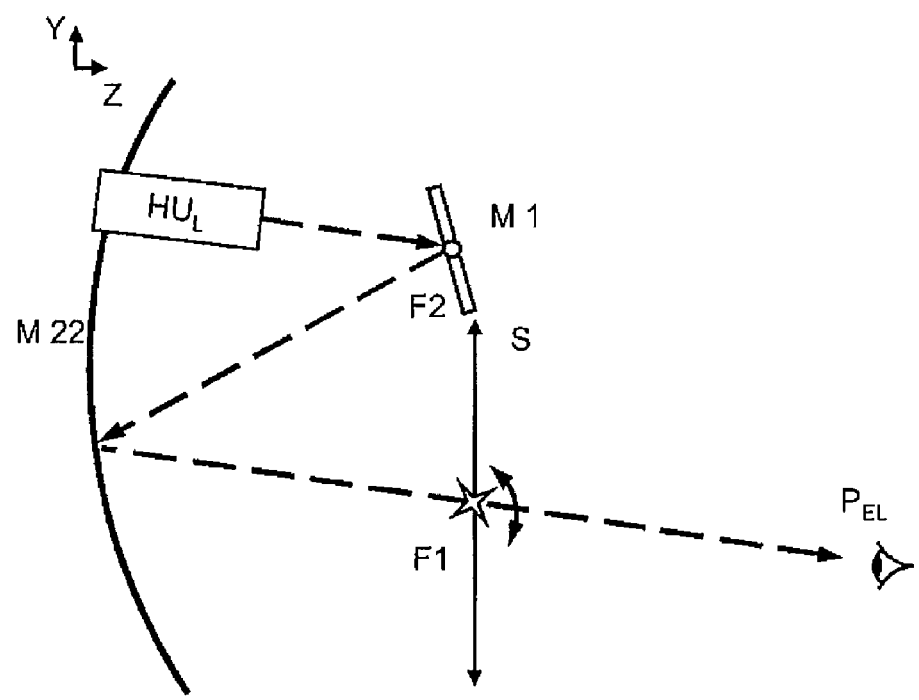

FIG. 7: is a side view of the embodiment of the invention shown in FIG. 6.

DETAILED DESCRIPTION

The technical problem which is solved by the present invention will now be explained with reference to FIG. 3. The system shown in FIG. 3 uses two of the aforementioned separate holographic units for holographic reconstruction. Each holographic unit $HU_R$, $HU_L$ comprises the spatial light modulator means with encodable modulator cells, shown in FIG. 1, an illumination means, which generates for illuminating the modulator cells a wave which is capable of generating interference, and optical projection means, which image the video hologram in an enlarged manner on to a display screen S. The image area of the video hologram corresponds with the light exit area on the display screen S.

The holographic units $HU_R$, $HU_L$ are preferably disposed in an observer plane OL above the head of an observer and emit modulated waves which contain holographic information along directions of propagation $D_R$ and $D_L$, respectively. A hologram processor, not shown, encodes the spatial light modulator means of the two holographic units $HU_R$ and $HU_L$ with holographic information. The two video holograms differ mainly in the information for their horizontal parallax. The holographic units $HU_R$, $HU_L$ are aligned in relation to the display screen S such that their respective directions of propagation $D_R$ and $D_L$ intersect on the display screen S in a point which defines the light exit position C.

Because the system realises the general principle disclosed in the international publication no. WO/2006/119760, the display screen S comes as a focussing reflector. The reflector images the illumination means of each holographic unit $HU_R$ and $HU_L$ into an observer plane OL at eye positions $P_{ER}$ and $P_{EL}$, respectively. This is why respective visibility regions at the eye positions $P_{ER}$ and $P_{EL}$ are characterised by two imaginary rectangular areas. If this general principle is employed, the reconstruction can only be watched through the visibility regions which correspond with the respective observer eyes.

More precisely, images of individual parts of the spatial frequency spectrum of each modulated wave which pass the spatial frequency filter AP shown in FIG. 1 are created there. Each holographic unit $HU_R$ and $HU_L$ realises for one observer eye a separate conical reconstruction space, whose visibility region faces the eye position $P_{ER}$ or $P_{EL}$. Each reconstruction space begins on the display screen and ends directly in front of the eye position $P_{ER}$ or $P_{EL}$. If the observer moves in front of the display screen S, a control unit CU must dislocate the two holographic units $HU_R$, $HU_L$ to corresponding positions. Two arrows 1 and 2 with opposing orientation therefore indicate a horizontal movement. Because each observer eye perceives the holographic representation as a separate reconstruction which differs in parallax, the optical axes of the two holographic units $HU_R$, $HU_L$ must always be positioned such that each observer eye perceives "its" reconstruction at the same position in relation to the display screen S. Because the geometry of the light exit area depends on the deviation of the eye position $P_{ER}$ or $P_{EL}$ from the optical axis of the display screen S, this condition is fulfilled if the two directions of propagation $D_R$ and $D_L$ intersect in a preferably central light exit position C on the display screen S.

FIG. 3 shows a simplified representation of the three-dimensional modulated wave, in order to maintain a certain clarity of the diagram. Only one, horizontal plane is shown of each wave, representing the centre plane of the three-dimensional wave on the respective optical axes of the two holographic units $HU_R$ and $HU_L$. In addition, broken and dotted lines indicate the vertical centre planes of the waves. The common intersection point of all centre planes defines the position of the light exit position C on the display screen S.

Because the holographic units $HU_R$, $HU_L$ image their video holograms in an enlarged manner almost on the entire reflecting surface of the display screen S, the used reflecting surface area defines the maximum range of vision when observing the reconstruction.

In a system which is designed to provide holographic reconstructions for multiple observers simultaneously, the embodiment shown in FIG. 3 would require further holographic units at further positions. The control unit CU had to move all holographic units to their respective working positions, as provided in the form of position information by an eye finder EF. Physically dislocating the holographic units in front of the display screen S would be very difficult and costly.

Now, the object to be solved by this invention is to use optical means for tracking in order to do without moving the holographic units. Moreover, a solution shall be found using which a small number of holographic units suffices for reconstruction spaces to be generated and tracked for multiple observers.

It is of no importance for the following description whether the holographic projection system has a focussing transmissive display screen in the form of a lens, or a focussing reflective display screen in the form of a focussing concave mirror. As far as the general idea of the invention is concerned, both embodiments can be used alternatively for the display screen.

Now, bearing in mind the problem discussed above, FIG. 4 shows a first embodiment with the help of which the general functional principle of the invention will be explained. The diagram only shows one single holographic unit HU, like the description below. This holographic unit HU again comprises the components already described above in order to image a wave $LW_{mod}$ modulated with holographic information into an initial direction of propagation $D_0$ as a video hologram. However, in contrast to the embodiment shown in FIG. 3, the holographic unit HU is disposed at a fix position in the holographic projection system in the embodiment according to the present invention. Further, FIG. 4 is a side view of the embodiment according to the present invention. This is to illustrate the tracking process with the example of compensating changes in the height of the eye position. Such tracking is for example necessary to adapt the visibility region to the height of an observer.

According to the invention, a pivoted tracking mirror M1 is disposed in the modulated wave $LW_{mod}$ in the illustrated embodiment. In order to track the modulated light waves in any direction, the tracking mirror M1 is preferably supported such that it can be turned around two axes which are perpendicular to each other, and such that it lies in the centre of the modulated wave with the direction of propagation $D_0$. In contrast to scanning devices, the tracking mirror M1 simultaneously reflects any light of the modulated wave $LW_{mod}$ which contributes to the interferences into a controllable direction of reflection $D_A$, where FIG. 4 only shows the exemplary portions $D_{A0}$ and $D_{A1}$.

In order to prevent differences in the transit time during propagation of the wave $LW_{mod}$, the tracking mirror M1 is preferably disposed at a position where an afocal lens system AF delivers an intermediate image of the video hologram.

In the present application, an afocal lens system is a lens system whose focal lengths are infinite, so that it receives collimated light waves and emits them again in a collimated manner.

In the present embodiment, the tracking mirror M1 is linked to position control means in the form of the control unit CU, which controls the inclination of the tracking mirror M1 according to the position information provided by an eye finder (not shown). The control unit CU controls both the inclination of the tracking mirror M1 and the position and inclination of a deflection mirror M2 which is disposed opposite the tracking mirror M1 such that the tracking mirror M1 reflects the modulated wave $LW_{mod}$ into a direction of reflection $D_A$ on to the deflection mirror M2, and that the deflection mirror M2 deflects the modulated wave $LW_{mod}$ through the fix common light exit position C on the display screen S towards the desired eye position $P_{EL}$. The tracking mirror M1 and the deflection mirror M2, together with the control unit CU thus form the deflection system according to this invention.

In this embodiment, the deflection mirror M2 must be disposed such that it is both pivoted and dislocatable, and it thus exhibits a great mobility.

The control unit CU moves both mirrors M1 and M2 in relation to the fix common light exit position C on the display screen S such that the following two conditions are fulfilled.

First, the optical axis on which the modulated waves $LW_{mod}$ propagate after reflection from the deflection mirror M2 towards the eye position $P_E$ must always run through the light exit position C.

Secondly, at least the optical path lengths of the modulated light wave planes which run though the common light exit position C remain constant, irrespective of the eye position $P_E$.

Because during tracking the wave $LW_{mod}$ leaves the display screen S through the light exit position C, irrespective of the desired eye position $P_E$, lateral shifting of the holographic reconstruction or individual reconstructed objects in front of the background of the display screen S while the observer moves is prevented. Only this way can the holographic system utilise the entire optically effective surface area of the display screen for any eye position, without loss of effective area.

Moreover, the former condition is an important prerequisite for a system which requires a separate reconstruction for each observer eye, because both reconstructions provided for one observer are always congruent and of the same size.

In addition, the latter condition reduces the efforts required to compensate optical aberrations and transit time differences among the light wave sections of the modulated wave, e.g. by temporally changed encoding.

According to this invention, the above-mentioned conditions cause the tracking mirror M1 and the deflection mirror M2 to be disposed at positions in relation to the common light exit position C for each eye position $P_E$ which are defined geometrically by an ellipsoid and its focal points.

As generally known, an ellipse has two foci and exhibits the property that a light wave which is directed from a focal point towards the curved outline of the ellipse will be reflected from any tangent of the ellipse such that its reflection runs through the other focal point.

With the help of the example shown in FIG. 4 the two above-mentioned conditions can be fulfilled optimally if The control unit CU moves the deflection mirror M2 like a tangent on an elliptic track, dependent on the inclination of the tracking mirror M1, The centre of the pivoted tracking mirror M1 is disposed in the focal point of that ellipse, and The common light exit position C on the display screen S is disposed in the other focal point of the elliptic track.

In order to direct the modulated wave $LW_{mod}$ at to the eye position $P_{EL1}$, for example, the control unit CU dislocates and turns the deflection mirror M2 along the outline of the ellipsoid into the mirror position $P_{M2}$. At the same time, the tracking mirror M1 is turned left by a few degrees. All movements are indicated by arrows 3, 4 and 5.

The deflection mirror M2 has a spherical surface in the present embodiment. This boasts the advantage that it images the intermediate image of the filtered video hologram onto or into the vicinity of the display screen. At the same time, the deflection mirror M2 images the spatial frequency spectrum filtered in the afocal system into the space in front of the display screen S in the form of an intermediate pupil, which is marked with the word "pupil" in FIG. 4. The position of the intermediate pupil depends on the eye position which is controlled by the wave tracking. The focussing display screen S images the intermediate pupil as an exit pupil into a visibility region, which corresponds with the eye position $P_{E1}$. The holographic reconstruction appears in the cone which stretches between the display screen S and the eye position $P_{E1}$.

However, the embodiment according to FIG. 4 has the disadvantage that moving the deflection mirror M2 requires a great mechanical effort and, due to the moment of inertia of mechanical systems, the tracking speed of the reconstruction system is limited.

Based on this disadvantage, FIG. 5 shows an improved and preferred embodiment of this invention. A large deflection mirror M21 is disposed at a fix position, so that the control unit CU only has to move the relatively small and lightweight tracking mirror M1. The deflection mirror M21 has a reflecting surface RA which has an overall dimension that is large enough that a part of the reflecting surface always lies in the optical path of the entire wave as reflected from the tracking mirror M1, irrespective of the set inclination of the tracking mirror M1, without the need to move the deflection mirror M21.

In this embodiment, merely by changing the inclination of the tracking mirror M1, the control unit CU thus achieves the same effect as would be caused by moving the entire holographic unit HU.

In order to fulfil the second one of the aforementioned conditions, the reflecting surface RA of the deflection mirror M21 is designed as a segment of an ellipsoid according to this embodiment of the present invention. This means that this reflecting surface RA too forms a concave mirror, which images the intermediate image of the video hologram, which already lies on the tracking mirror M1, in an enlarged manner into the vicinity of the display screen S.

Thanks to the improved embodiment according to FIG. 5, where the large deflection mirror M21 is disposed at a fix position, separate reconstruction spaces for different eye positions can be generated in a time-multiplex process using a single holographic unit HU. To achieve this, a hologram processor encodes the modulator cells of the spatial light modulator means of the holographic unit HU with a hologram sequence, which alternately contains hologram information which corresponds with the currently served eye position. In order to direct only that modulated wave which contains the respective hologram information at a certain eye position, the control unit CU must merely move the tracking mirror M1 such that it oscillates between two angular positions in synchronism with the hologram sequence. As a relatively small and lightweight type of tracking mirror M1 is used, this oscillation can be performed at sufficient speed, so that a single holographic unit HU can provide holographic reconstructions for different eye positions in a time-multiplex process without flickering.

FIG. 6 is a top view showing a further embodiment of the present invention. For reasons of clarity, the following Figures only show the optical axes of the optical path towards the eye positions $P_{EL}$ and $P_{ER}$ of an observer, instead of the entire modulated wave.

In this embodiment, a deflection mirror M22 has a circular arc shaped reflecting surface in the shown X dimension, said reflecting surface forming a segment of a circle. The deflection mirror M22 is again disposed at a fix position in the system. In this view, the light exit position C on the display screen is in the centre of the circle of the circular reflecting surface. The tracking mirror M1, which can be turned in multiple directions can for example be disposed above or below the light exit on the display screen S, in order not to disturb the optical path of the redirected modulated wave with its shadows. According to the position of the tracking mirror M1, one or two holographic units $HU_R$, $HU_L$ (as shown in FIG. 6) would preferably also be disposed above or below the deflection mirror M22 and be directed at the tracking mirror M1.

FIG. 7 is a side view of the same embodiment of the invention, showing an example of the position of the holographic unit $HU_L$ in relation to the tracking mirror M1, the deflection mirror M22, and the display screen S. All optical elements are arranged in the optical path at various heights, so that the modulated wave generally propagates at an angle to the optical axes.

This embodiment of the invention must also image the video hologram into an image plane with the light exit position C of the display screen S being the centre. Because constant optical path lengths are thus required for deflection, the deflection mirror M22 must again have an elliptic geometry in the view shown in FIG. 7. In the example, the light exit position C is again disposed in the lower focal point F1, and the rotation axes of the tracking mirror M1 is disposed in the upper focal point F2 of the deflection mirror M22, which exhibits the shape of a vertical segment of an ellipsoid.

FIGS. 6 and 7 also show that the optical path of the modulated and redirected wave between tracking mirror M1, deflection mirror M22 and display screen S only runs along an optical axis of an optical element for few eye positions. The oblique course of the optical path through an optical element can substantially disturb the structure of the modulated wave and must be taken into account in the optical design of the system and during encoding, and be compensated accordingly.

Although this reconstruction system is also able to provide multiple holographic reconstructions in a time-multiplex process, FIG. 6 illustrates an embodiment where multiple holographic reconstructions are realised using a space-multiplex method. For this, the system comprises for each observer eye a separate holographic unit $HU_R$ and $HU_L$. Both units can be positioned in the system such that each one intrinsically generates a separate reconstruction space through reflections from the commonly used tracking mirror M1 and deflection mirror M21 corresponding to the direction of propagation $D_L$ or $D_R$ depending on respective eye positions.

According to yet another embodiment of the invention, also the optical wave tracking means may include further deflection mirrors or multiple tracking mirrors in order to achieve a compact design. A curved shape of one or multiple additional mirrors can preferably support the compensation of different optical path lengths in the holographic reconstruction system.

The invention claimed is:

1. Holographic reconstruction system for reconstructing a scene which comprises spatial light modulator means, which modulate a wave with holographic information, and optical wave tracking means, which give the optical path of the modulated wave in the reconstruction system a desired direction of propagation, wherein Position control means, which control tracking mirror means, whose inclination can be controlled, and which are disposed inside the reconstruction system in front of a display screen, to control a direction of reflection for reflecting the modulated wave, and Deflection mirror means, which are disposed between the display screen and the tracking mirror means such that an image of the spatial light modulator means is created on or at least near the display screen, and which guide the modulated wave through a fix light exit position of the display screen out of the reconstruction system, Where the position control means control the tracking mirror means and the deflection mirror means such that The deflection mirror means direct the reflected wave through the display screen into a desired direction of propagation, and that The length of the optical path from the tracking mirror means to the light exit position remains constant for all sections of the modulated wave, irrespective of a set inclination of the tracking mirror means.

2. Holographic reconstruction system according to claim 1,

Where the deflection mirror means have a concave surface which has the shape of an ellipsoid with two foci, Where a centre of the tracking mirror means is disposed in the focal point of that ellipsoid, and Where the display screen has a fix light exit position, which lies in the other focal point of the ellipsoid.

3. Holographic reconstruction system according to claim 1 with a focusing display screen for imaging the light source onto an observer eye.

4. Holographic reconstruction system according to claim 3 where the deflection mirror means have a concave reflecting surface in order to image an intermediate image of the video hologram in an enlarged manner into the image plane.

5. Holographic reconstruction system according to claim 4 with an afocal lens system which generates a spatial frequency spectrum of the video hologram, where the optical wave tracking is designed such that the spatial frequency spectrum is imaged on the hologram side in front of the display screen so to form an intermediate pupil, and where the focussing display screen images the intermediate pupil as the exit pupil of the system to an eye position of an observer eye.

6. Holographic reconstruction system according to claim 1,
Where the controllable tracking mirror means are disposed at a position where an intermediate image of a video hologram appears which is created on the spatial light modulator means which are encoded with holographic information, and
Where the deflection mirror means are disposed between the tracking mirror means and the light exit position such that the video hologram is imaged onto the display screen.

7. Holographic reconstruction system according to claim 1 where the deflection mirror means have a reflecting surface with a size and geometry such that a part of the reflecting surface always lies in the optical path of the entire wave as reflected from the tracking mirror means, irrespective of the set inclination of the tracking mirror means.

8. Holographic reconstruction system according to claim 7 where the deflection mirror means are disposed at a fix position in the system, and have an elliptic reflecting surface which has the shape of a segment of an ellipsoid, so that the deflection mirror means project the image of the video hologram in an enlarged manner into the image plane.

9. Holographic reconstruction system according to claim 1,
Where light modulator means in holographic units generate a separate modulated wave for each observer eye, and
Where the holographic units are disposed locally in relation to the tracking mirror means and the deflection mirror means such that, irrespective of the inclination of the tracking mirror means, an optical axes at least of all waves which are directed at one and the same observer run through an identical light fix exit position on the display screen.

10. Holographic reconstruction system according to claim 1 where the light modulator means in holographic units generate a separate modulated wave for each observer eye, and where each holographic unit is assigned with a separate mirror, where the position control means control the inclination of each mirror in accordance with a current position of the corresponding observer eye.

11. Holographic reconstruction system according to claim 1 with a single holographic unit for generating separate reconstruction spaces for multiple eye positions in a time multiplex mode with a tracking mirror means which oscillates between two angular positions in synchronism with a hologram sequence.

12. Holographic reconstruction system according to claim 1 where a lens function is encoded on the spatial light modulator means.

13. Holographic reconstruction system according to claim 1 with additional deflection mirrors for folding the wave in order to reduce the depth of the system.

* * * * *